US011841078B2

(12) United States Patent
Jin et al.

(10) Patent No.: US 11,841,078 B2
(45) Date of Patent: Dec. 12, 2023

(54) HYDRAULIC CONTROL SYSTEM FOR PRIMING CLUTCHES OF AN AUTOMATIC TRANSMISSION WHEN THE AUTOMATIC TRANSMISSION IS IN PARK

(71) Applicant: GM GLOBAL TECHNOLOGY OPERATIONS LLC, Detroit, MI (US)

(72) Inventors: Timothy Z. Jin, Fremont, CA (US); Steven P. Moorman, Pinckney, MI (US); Kenneth William Lampert, Royal Oak, MI (US); Patrick Jebson Carroll, West Bloomfield, MI (US); Leah Rose Bridson, Hartland, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 166 days.

(21) Appl. No.: 17/508,584

(22) Filed: Oct. 22, 2021

(65) Prior Publication Data

US 2023/0126525 A1    Apr. 27, 2023

(51) Int. Cl.
*F16H 61/02*    (2006.01)
*G05D 16/20*    (2006.01)
*F16H 61/12*    (2010.01)

(52) U.S. Cl.
CPC ......... *F16H 61/0206* (2013.01); *F16H 61/12* (2013.01); *G05D 16/2022* (2019.01); *F16H 2061/1208* (2013.01)

(58) Field of Classification Search
CPC ................. F16H 61/0206; F16H 61/12; F16H 2061/1208; G05D 16/2022
See application file for complete search history.

(56) References Cited

U.S. PATENT DOCUMENTS 8,702,548 B2    4/2014    Moorman

FOREIGN PATENT DOCUMENTS

DE    3934674 A1    5/1990

OTHER PUBLICATIONS

Office Action dated Mar. 13, 2023 from German Patent Office for German Patent Application No. 102022122367.1; 4 pages.

*Primary Examiner* — Daphne M Barry (57) ABSTRACT

A transmission hydraulic control system includes a manual valve, a default valve, and a clutch prime valve. The manual valve allows fluid flow from a pressurized line to a drive line when the manual valve is open (when a transmission is in drive or reverse). The manual valve prevents fluid flow from the pressurized line to the drive line when the manual valve is closed (when the transmission is in neutral or park). The clutch prime valve allows fluid to flow from the pressurized line to the drive line, and thereby bypass the manual valve, when the manual valve is closed and the clutch prime valve is open. The default valve allows fluid bypassing the manual valve to flow to prime a clutch of the transmission when the default valve is open. The clutch prime valve prevents fluid from bypassing the manual valve when the clutch prime valve is closed.

19 Claims, 4 Drawing Sheets

HYDRAULIC CONTROL SYSTEM FOR PRIMING CLUTCHES OF AN AUTOMATIC TRANSMISSION WHEN THE AUTOMATIC TRANSMISSION IS IN PARK

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to hydraulic control systems for priming clutches of an automatic transmission when the automatic transmission is in park.

A hydraulic control system for an automatic transmission typically includes a manual valve and a default valve. The manual valve is adjustable to one of a plurality of positions by adjusting the position of a gear selector that is connected to the manual valve. When the gear selector is in neutral or park, the manual valve prevents the flow of pressurized fluid from a pressurized line to a drive line or a reverse line. When the gear selector is in drive or reverse, the manual valve allows the flow of pressurized fluid from the pressurized line to the drive line or the reverse line.

The default valve regulates fluid flow from the drive line to a clutch supply line. Allowing pressurized fluid to flow through the clutch supply line enables actuation of a clutch of the transmission. Preventing pressurized fluid from flowing through the clutch supply line disables actuation of the clutch.

SUMMARY

An example of a hydraulic control system for a transmission according to the present disclosure is described herein. The hydraulic control system includes a manual valve, a default valve, and a clutch prime valve. The manual valve is configured to allow fluid flow from a pressurized line to a drive line when the manual valve is open, and prevent fluid flow from the pressurized line to the drive line when the manual valve is closed. The manual valve is open when the transmission is in drive or reverse, and the manual valve is closed when the transmission is in neutral or park. The default valve is configured to allow fluid flow from the drive line to at least one clutch supply line when the default valve is open, and prevent fluid flow from the drive line to the at least one clutch supply line when the default valve is closed. The clutch prime valve is configured to allow pressurized fluid to flow from the pressurized line to the drive line, and thereby bypass the manual valve, when the manual valve is closed and the clutch prime valve is open. The default valve allows pressurized fluid bypassing the manual valve to flow to the at least one clutch supply line and thereby prime at least one clutch of the transmission when the default valve is open. The clutch prime valve is configured to prevent pressurized fluid from bypassing the manual valve when the clutch prime valve is closed.

In one aspect, the default valve is configured to prevent pressurized fluid bypassing the manual valve from flowing to the at least one clutch supply line when the default valve is closed.

In one aspect, the hydraulic control system further includes a default solenoid configured to regulate fluid flow to the default valve and thereby actuate the default valve between its open and closed positions.

In one aspect, the hydraulic control system further includes a clutch prime solenoid configured to regulate fluid flow to the clutch prime valve and thereby actuate the clutch prime valve between its open and closed positions.

In one aspect, the manual valve has an inlet port connected to the pressurized line and an outlet port connected to a clutch prime enable line through the drive line, the default valve has a first inlet port connected to the pressurized line, a first outlet port connected to a clutch prime feed line, a second inlet port connected to the drive line, and a second outlet port connected to a first clutch supply line, and the clutch prime valve has an inlet port connected to the clutch prime feed line and an outlet port connected to the clutch prime enable line. When the default valve and the clutch prime valve are open, pressurized fluid is allowed to flow from the pressurized line to the first clutch supply line and thereby prime a first clutch of the transmission.

In one aspect, the clutch prime valve is configured to exhaust pressurized fluid from the clutch prime enable line and the clutch prime feed line when the clutch prime valve is closed.

In one aspect, the hydraulic control system further includes a check valve that connects the clutch prime enable line to the drive line. The check valve is configured to prevent fluid flow from the clutch prime enable line to a first portion of the drive line extending from the outlet port of the manual valve to the check valve, and allow fluid flow from the clutch prime enable line to a second portion of the drive line extending from the check valve to the second inlet port of the default valve.

In one aspect, the first portion of the drive line is connected to an exhaust port of the manual valve when the manual valve is closed, and therefore the check valve is configured to prevent fluid in the clutch prime enable line from exhausting through the manual valve.

In one aspect, the hydraulic control system further includes a second clutch supply line that is connected to the second portion of the drive line. When the default valve and the clutch prime valve are open, pressurized fluid is allowed to flow from the pressurized line to the second clutch supply line and thereby prime a second clutch of the transmission.

In one aspect, the clutch prime feed line supplies pressurized fluid to a torque converter clutch valve when the default valve is open, and pressurized fluid in the clutch prime feed line is exhausted when the default valve is closed.

In one aspect, the hydraulic control system further includes a valve diagnostic module configured to determine that the clutch prime valve is stuck open based on actuation of a torque converter clutch regulated by the torque converter clutch valve.

Another example of a hydraulic control system for a transmission according to the present disclosure is described herein. The hydraulic control system includes a manual valve, a default valve, and a clutch prime valve. The manual valve has an inlet port connected to a pressurized line and an outlet port connected to a drive line. The default valve has a first inlet port connected to the pressurized line, a first outlet port connected to a clutch prime feed line, a second inlet port connected to the drive line, and a second outlet port connected to a first clutch supply line. The clutch prime valve has an inlet port connected to the clutch prime feed line and an outlet port connected to the drive line via a clutch prime enable line. When the manual valve is closed, the default valve is open, and the clutch prime valve is open, pressurized fluid is allowed to flow from the pressurized line to the first clutch supply line and thereby prime a first clutch of the transmission.

In one aspect, the manual valve allows fluid flow from its inlet port to its outlet port when the manual valve is open, the manual valve prevents fluid flow from its inlet port to its outlet port when the manual valve is closed, the manual valve is open when the transmission is in drive or reverse, and the manual valve is closed when the transmission is in neutral or park.

In one aspect, the default valve allows fluid flow from the first and second inlet ports to the first and second outlet ports, respectively, when the default valve is open, and the default valve prevents fluid flow from the first and second inlet ports to the first and second outlet ports, respectively, when the default valve is closed.

In one aspect, the clutch prime valve allows fluid flow from its inlet port to its outlet port when the clutch prime valve is open, and the clutch prime valve prevents fluid flow from its inlet port to its outlet port when the clutch prime valve is closed.

In one aspect, the hydraulic control system further includes a default solenoid configured to regulate fluid flow to the default valve and thereby actuate the default valve between its open and closed positions.

In one aspect, the hydraulic control system further includes a clutch prime solenoid configured to regulate fluid flow to the clutch prime valve and thereby actuate the clutch prime valve between its open and closed positions.

In one aspect, the hydraulic control system further includes a check valve that connects the clutch prime enable line to the drive line. The check valve prevents fluid flow from the clutch prime enable line to a first portion of the drive line extending from the outlet port of the manual valve to the check valve, and the check valve allows fluid flow from the clutch prime enable line to a second portion of the drive line extending from the check valve to the second inlet port of the default valve.

In one aspect, the first portion of the drive line is connected to an exhaust port of the manual valve when the manual valve is closed, and therefore the check valve prevents fluid in the clutch prime enable line from exhausting through the manual valve.

In one aspect, the hydraulic control system further includes a second clutch supply line that is connected to the second portion of the drive line. When the default valve and the clutch prime valve are open, pressurized fluid is allowed to flow from the pressurized line to the second clutch supply line and thereby prime a second clutch of the transmission.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A hydraulic control system for an automatic transmission typically prevents the flow of pressurized hydraulic fluid to any drive or reverse clutches of the transmission when a gear selector for the transmission is in neutral or park. This feature ensures that the transmission is not inadvertently shifted to a drive or reverse gear. However, this feature may increase the variation in the time to fill the drive or reverse clutches when the gear selector is initially shifted to a drive or reverse gear, which may degrade customer feel and increase warranty.

A hydraulic control system according to the present disclosure addresses these issues by priming the drive and reverse clutches when the gear selector is in neutral or park, such as before the first shift of the day occurs. The hydraulic control system primes the drive and reverse clutches by filling the drive and reverse clutches with hydraulic fluid and displacing air. In one example, the hydraulic control system includes a clutch prime valve and a solenoid that actuates the clutch prime valve to temporarily allow actuation of the drive and reverse clutches. In another example, the hydraulic control system includes hardware components, such as a unique default valve, the clutch prime valve, and a valve diagnostic module, which ensure that the drive and reverse clutches are only filled when priming is desired. The valve diagnostic module diagnoses when the clutch prime valve is stuck in one position.

Figure 1:
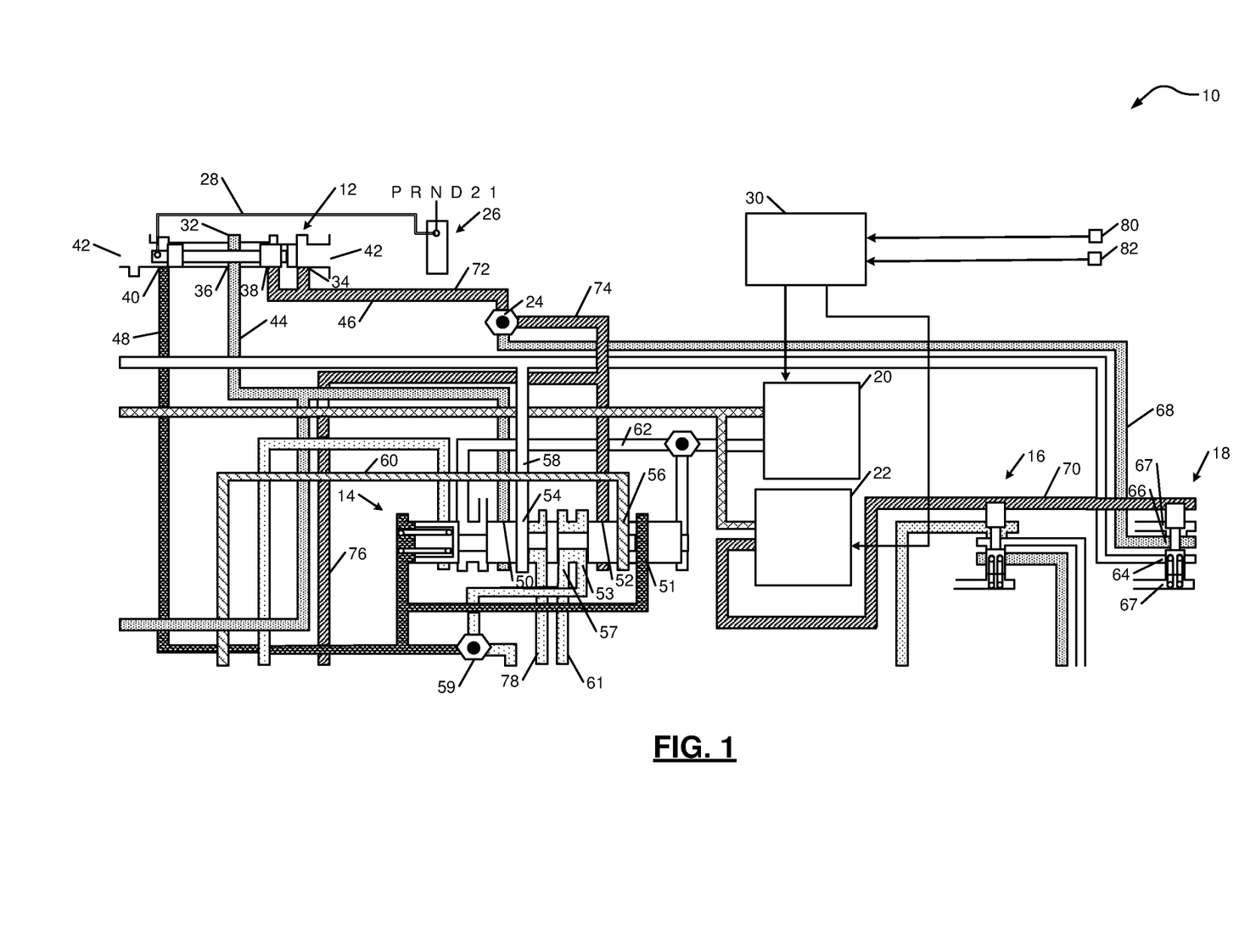
FIG. 1 is a schematic of an example of a hydraulic control system according to the present disclosure, the hydraulic control system including a default valve and a clutch prime valve that are shown in their respective closed positions.
Figure 2:
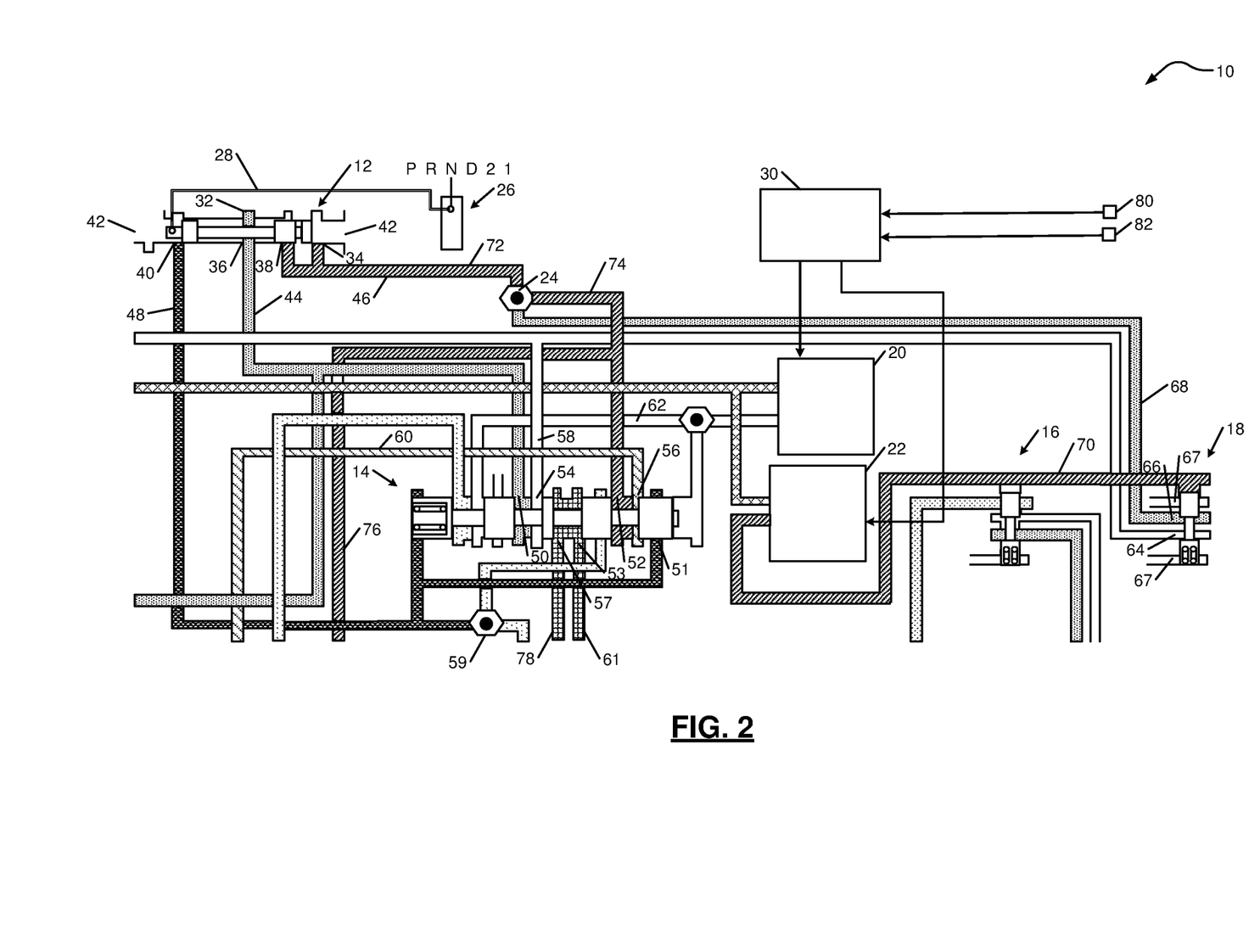
FIG. 2 is a schematic of the hydraulic control system of FIG. 1 with the default valve and the clutch prime valve shown in their respective open positions.

Referring now to FIGS. 1 and 2, a hydraulic control system 10 for an automatic transmission is shown. The hydraulic control system 10 incudes a manual valve 12, a default valve 14, a boost valve 16, a clutch prime valve 18, a default solenoid 20, a clutch prime solenoid 22, and a check valve 24. The manual valve 12 is adjustable to a plurality of positions by moving or manipulating a gear selector 26. In the example shown, a mechanical link 28 connects the manual valve 12 to the gear selector 26. In other examples, the position of the gear selector 26 may be measured using a sensor (not shown), and a valve control module 30 may control a solenoid to adjust the position of the manual valve 12 based on the gear selector position. The valve control module 30 may be part of the hydraulic control system 10.

The manual valve 12 has a first inlet port 32, a second inlet port 34, a first outlet port 36, a second outlet port 38, a third outlet port 40, and exhaust ports 42. The first inlet port 32 is connected to a pressurized line 44 that contains pressurized fluid. The second inlet port 34 is connected to a drive line 46. The first outlet port 36 is connected to the pressurized line 44. The second outlet port 38 is connected to the drive line 46. The third outlet port 40 is connected to a reverse line 48. The exhaust ports 42 are connected to an exhaust line (not shown).

The manual valve 12 is in a first position shown in FIG. 1 when the gear selector 26 and the transmission are in neutral, and the manual valve 12 is in a second position when the gear selector 26 and the transmission are in park. In either one of the first or second positions, the manual valve 12 prevents fluid flow from the pressurized line 44 to the drive line 46. Thus, each of the first and second positions of the manual valve 12 may be referred to as a closed position. In either one of the first or second positions, the manual valve 12 allows fluid flow from the drive line 46 and the reverse line 48 to the exhaust line.

The manual valve 12 is in a third position when the gear selector 26 and the transmission are in drive, and the manual valve 12 is and a fourth position when the gear selector 26 and the transmission are in reverse. In the third position, the manual valve 12 allows fluid flow from the pressurized line 44 to the drive line 46. In the fourth position, the manual valve 12 allows fluid flow from the pressurized line 44 to the reverse line 48. Thus, each of the third and fourth positions of the manual valve 12 may be referred to as open positions. In the third position, the manual valve 12 prevents fluid flow from the drive line 46 to the exhaust line, and the manual valve 12 allows fluid flow from the reverse line 48 to the exhaust line. In the fourth position, the manual valve 12 allows fluid flow from the drive line 46 to the exhaust line, and the manual valve 12 prevents fluid flow from the reverse line 48 to the exhaust line.

As used herein, the terms "first position," "second position," "third position," and "fourth position" do not indicate the shifting order of the transmission. Rather, the terms "first position," "second position," "third position," and "fourth position" simply indicate the order in which these positions are introduced herein. For example, the discussion above indicates that the manual valve 12 is in the first, second, third, and fourth positions when the gear selector 26 and the manual valve 12 are in neutral, park, drive, and reverse, respectively. However, the shifting order of the transmission may be park (first), reverse (second), neutral (third), drive (fourth), and low (fourth).

The default valve 14 has a first inlet port 50, a second inlet port 52, a third inlet port 51, a fourth inlet port 53, a first outlet port 54, a second outlet port 56, and a third outlet port 57. The first inlet port 50 is connected to the pressurized line 44. The second inlet port 52 is connected to the drive line 46. The third inlet port 51 is directly connected to the reverse line 48. The fourth inlet port 53 is connected to the reverse line 48 via a check valve 59. The first outlet port 54 is connected to a clutch prime feed line 58. The second outlet port 56 connected to a first clutch supply line 60 that supplies pressurized fluid to a first clutch of the transmission to enable the first clutch to be engaged. The third outlet port 57 is connected to a reverse clutch supply line 61.

The default solenoid 20 regulates the flow of hydraulic fluid (e.g., oil) to the default valve 14 through a default valve control line 62 to actuate the default valve 14 between a first position shown in FIG. 1 and a second position shown in FIG. 2. The default solenoid 20 adjusts the default valve 14 between its first and second position in response to a default valve control signal from the valve control module 30. In its first position, the default valve 14 prevents fluid flow from the pressurized line 44 to the clutch prime feed line 58 and prevents fluid flow from the drive line 46 to the first clutch supply line 60. Thus, the first position of the default valve 14 may be referred to as its closed position. In its second position, the default valve 14 allows fluid flow from the pressurized line 44 to the clutch prime feed line 58 and allows fluid flow from the drive line 46 to the first clutch supply line 60. Thus, the second position of the default valve 14 may be referred to as its open position.

When the manual valve 12 is in the fourth position, fluid in the reverse line 48 forces the default valve 14 to its closed position shown in FIG. 1. In turn, fluid in the reverse line 48 flows through the third inlet port 51 of the default valve 14, through the second outlet port 56 of the default valve 14, and to the first clutch supply line 60. In addition, fluid in the reverse line 48 flows through the check valve 59, through the fourth inlet port 53 of the default valve 14, through the third outlet port 57 of the default valve 14, and to the reverse clutch supply line 61.

The clutch prime valve 18 has an inlet port 64, an outlet port 66, and exhaust ports 67. The inlet port 64 is connected to the clutch prime feed line 58. The outlet port 66 is connected to a clutch prime enable line 68. The exhaust ports 67 are connected to the exhaust line.

The clutch prime solenoid 22 regulates the flow of hydraulic fluid to the clutch prime valve 18 through a clutch prime valve control line 70 to actuate the clutch prime valve 18 between a first position shown in FIG. 1 and a second position shown in FIG. 2. The clutch prime solenoid 22 adjusts the clutch prime valve 18 between its first and second position in response to a clutch prime valve control signal from the valve control module 30. The clutch prime solenoid 22 also adjusts the position of the boost valve 16 by regulating the flow of hydraulic fluid through the clutch prime valve control line 70. In this regard, the clutch prime solenoid 22 may be referred to as a boost solenoid. Controlling two valves using a single solenoid reduces the cost and complexity of the hydraulic control system 10.

In its first position, the clutch prime valve 18 prevents fluid flow from the clutch prime feed line 58 to the clutch prime enable line 68. In addition, the clutch prime valve 18 allows fluid flow from the clutch prime feed line 58 and the clutch prime enable line 68 to the exhaust line. In its second position, the clutch prime valve 18 allows fluid flow from the clutch prime feed line 58 to the clutch prime enable line 68. In addition, the clutch prime valve 18 prevents fluid flow from either one of the clutch prime feed line 58 and the clutch prime enable line 68 to the exhaust line.

The check valve 24 connects the clutch prime enable line 68 to the drive line 46. The check valve 24 prevents fluid flow from the clutch prime enable line 68 to a first portion 72 of the drive line 46 extending from the second outlet port 38 of the manual valve 12 to the check valve 24. The check valve 24 allows fluid flow from the clutch prime enable line 68 to a second portion 74 of the drive line 46 extending from the check valve 24 to the second inlet port 52 of the default valve 14. The second portion 74 of the drive line 46 is connected to a second clutch supply line 76 that supplies pressurized fluid to a second clutch of the transmission to enable the second clutch to be engaged.

The transmission may include one or more (e.g., two) clutches other than the first and second clutches. The other clutches may receive pressurized fluid directly from the pressurized line 44, and therefore may be engaged regardless of whether the gear selector 26 is in neutral or park. However, shifting the transmission to a drive or reverse gear may require engaging the other clutches and at least one of the first and second clutches.

The valve control module 30 outputs the default valve control signal and the clutch prime valve control signal to the default solenoid 20 and the clutch prime solenoid 22, respectively, to adjust the positions of the default valve 14 and the clutch prime valve 18. The valve control module 30 may adjust the position of the default valve 14 and the clutch prime valve 18 based on the gear selector position. For example, the valve control module 30 may normally adjust the default valve 14 and the clutch prime valve 18 to their respective first positions when the gear selector 26 is in neutral or park. However, the valve control module 30 may periodically adjust the default valve 14 and the clutch prime valve 18 to their respective second positions when the gear selector 26 is in neutral or park to prime clutches of the transmission as discussed below.

In FIGS. 1 and 2, the gear selector 26 and the transmission are in neutral, and therefore the manual valve 12 is in its first position. In addition, in FIG. 1, the default solenoid 20 and the clutch prime solenoid 22 are off, and therefore the default valve 14 and the clutch prime valve 18 are in their respective first positions. Fluid in the first portion 72 of the drive line 46 is exhausted through the manual valve 12 when the manual valve 12 is in its first position. Thus, pressurized fluid cannot flow from the first portion 72 of the drive line 46 to the first and second clutch supply lines 60 and 76, and therefore the first and second clutches of the transmission cannot be engaged.

In FIG. 2, the default solenoid 20 and the clutch prime solenoid 22 are on, and therefore the default valve 14 and the clutch prime valve 18 are in their respective second positions. In turn, pressurized fluid flows from the pressurized line 44 to the clutch prime feed line 58 through the default valve 14, and from the clutch prime feed line 58 to the clutch prime enable line 68 through the clutch prime valve 18. In addition, pressurized fluid flows from the clutch prime enable line 68 to the second portion 74 of the drive line 46 through the check valve 24, and from the second portion 74 of the drive line 46 to the first clutch supply line 60 through the default valve 14. Thus, the clutch prime valve 18 allows pressurized fluid to flow from the pressurized line 44 to the drive line 46, and thereby bypass the manual valve 12, when the manual valve 12 is closed and the clutch prime valve 18 is open. Furthermore, pressurized fluid flows from the second portion 74 of the drive line 46 to the second clutch supply line 76, and the check valve 24 prevents pressurized fluid in the clutch prime enable line 68 from exhausting through the manual valve 12. Thus, the default valve 14 allows pressurized fluid bypassing the manual valve 12 to flow to the first and second clutch supply lines 60 and 76 and thereby prime the first and second clutches of the transmission when the default valve 14 is open.

In addition to providing a way to bypass the manual valve 12 to prime the first and second clutches when the transmission is in neutral or park, the hydraulic control system 10 includes three hardware components that prevent engagement of the first or second clutch of the transmission when the transmission is in neutral or park. These hardware components include the default valve 14, the clutch prime valve 18, and the valve control module 30. If any one of these hardware components is not functioning properly, at least one of the other two components prevent engagement of the first or second clutch of the transmission when the transmission is in neutral or park.

Figure 3:
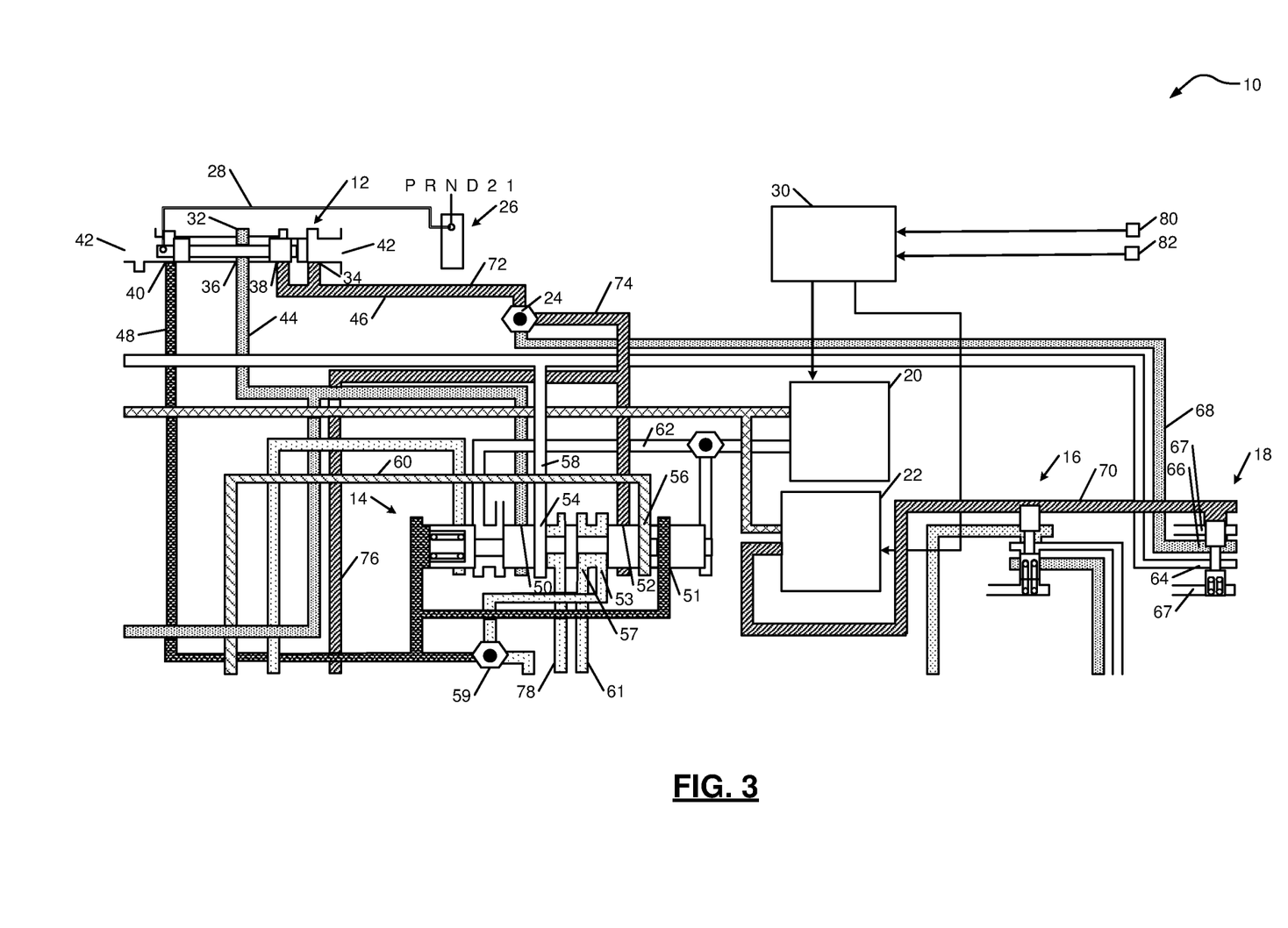
FIG. 3 is a schematic of the hydraulic control system of FIG. 1 with the default valve shown in its closed position and the clutch prime valve shown in its open position.
Figure 4:
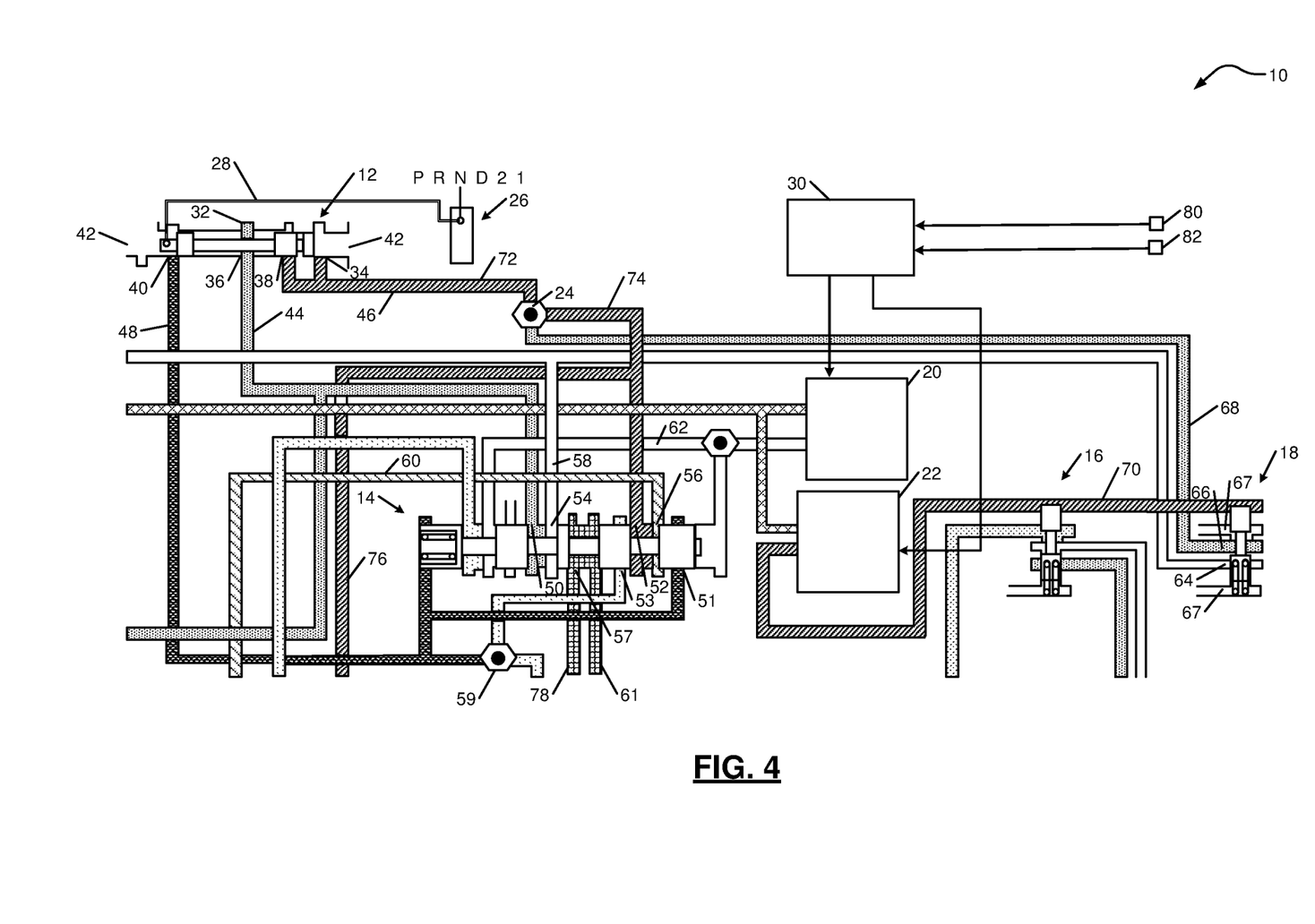
FIG. 4 is a schematic of the hydraulic control system of FIG. 1 with the default valve shown in its open position and the clutch prime valve shown in its closed position.

Referring now to FIGS. 3 and 4, two possible hardware failure modes of the hydraulic control system 10 are illustrated. In FIG. 3, the clutch prime solenoid 22 is commanded off to adjust the clutch prime valve 18 to its first position. However, the clutch prime valve 18 is stuck in its second position. Nonetheless, the default solenoid 20 is commanded off, and therefore the default valve 14 is in its first position. In turn, the default valve 14 prevents fluid flow from the pressurized line 44 to the clutch prime enable line 68. In addition, fluid in the clutch prime feed line 58 is exhausted to an exhaust line 78 through the default valve 14. Therefore, even though the clutch prime valve 18 is stuck in its second position, there is no way for pressurized fluid bypassing the manual valve 12 to flow to the first or second clutch supply line 60 or 76 to enable engagement of the first or second clutch of the transmission.

In FIG. 4, the default solenoid 20 is commanded off to adjust the default valve 14 to its first position. However, the default valve 14 is stuck in its second position, which allows fluid to flow from the pressurized line 44 to the clutch prime feed line 58. Nonetheless, the clutch prime solenoid 22 is commanded off, and therefore the clutch prime valve 18 is in its first position. In turn, the clutch prime valve 18 prevents pressurized fluid from bypassing the manual valve 12 by preventing fluid flow from the clutch prime feed line 58 to the clutch prime enable line 68. In addition, fluid in the clutch prime enable line 68 is exhausted through the clutch prime valve 18. Therefore, even though the default valve 14 is stuck in its second position, there is no way for pressurized fluid to flow to the first or second clutch supply line 60 or 76 to enable engagement of the first or second clutch of the transmission.

In various implementations, the valve control module 30 diagnoses when the default valve 14 or the clutch prime valve 18 is stuck in its first position based on inputs from an engine speed sensor 80 and a turbine speed sensor 82. In this regard, the valve control module 30 may be referred to as a valve diagnostic module. The engine speed sensor 80 measures the speed of an engine that is coupled to the transmission. The turbine speed sensor 82 measures the speed of a turbine in a torque converter that couples the engine to the transmission.

In one example, the clutch prime feed line 58 supplies hydraulic fluid to regulator valve for a clutch of the torque converter. Thus, the valve control module 30 may diagnose whether the clutch prime valve 18 is stuck open based on actuation of the torque converter clutch. The valve control module 30 may assess actuation of the torque converter clutch based on the engine speed and the turbine speed. For example, the valve control module 30 may determine that the torque converter clutch is stuck in an engaged position when the turbine speed is less than the engine speed while the transmission is in neutral or park.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another redefault within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/outlet system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A hydraulic control system for a transmission, the hydraulic control system comprising:
 a manual valve configured to:
  allow fluid flow from a pressurized line to a drive line when the manual valve is open; and
  prevent fluid flow from the pressurized line to the drive line when the manual valve is closed, wherein the manual valve is open when the transmission is in drive or reverse, and the manual valve is closed when the transmission is in neutral or park;
 a default valve configured to:
  allow fluid flow from the drive line to at least one clutch supply line when the default valve is open; and
  prevent fluid flow from the drive line to the at least one clutch supply line when the default valve is closed; and
 a clutch prime valve configured to:
  allow pressurized fluid to flow from the pressurized line to the drive line, and thereby bypass the manual valve, when the manual valve is closed and the clutch prime valve is open, wherein the default valve allows pressurized fluid bypassing the manual valve to flow to the at least one clutch supply line and thereby prime at least one clutch of the transmission when the default valve is open; and prevent pressurized fluid from bypassing the manual valve when the clutch prime valve is closed, wherein:

the manual valve has an inlet port connected to the pressurized line and an outlet port connected to a clutch prime enable line through the drive line;

the default valve has a first inlet port connected to the pressurized line, a first outlet port connected to a clutch prime feed line, a second inlet port connected to the drive line, and a second outlet port connected to a first clutch supply line; and the clutch prime valve has an inlet port connected to the clutch prime feed line and an outlet port connected to the clutch prime enable line, wherein when the default valve and the clutch prime valve are open, pressurized fluid is allowed to flow from the pressurized line to the first clutch supply line and thereby prime a first clutch of the transmission.

2. The hydraulic control system of claim 1 wherein the default valve is configured to prevent pressurized fluid bypassing the manual valve from flowing to the at least one clutch supply line when the default valve is closed.

3. The hydraulic control system of claim 1 further comprising a default solenoid configured to regulate fluid flow to the default valve and thereby actuate the default valve between its open and closed positions.

4. The hydraulic control system of claim 1 further comprising a clutch prime solenoid configured to regulate fluid flow to the clutch prime valve and thereby actuate the clutch prime valve between its open and closed positions.

5. The hydraulic control system of claim 1 wherein the clutch prime valve is configured to exhaust pressurized fluid from the clutch prime enable line and the clutch prime feed line when the clutch prime valve is closed.

6. The hydraulic control system of claim 1 further comprising a check valve that connects the clutch prime enable line to the drive line, wherein the check valve is configured to:

prevent fluid flow from the clutch prime enable line to a first portion of the drive line extending from the outlet port of the manual valve to the check valve; and allow fluid flow from the clutch prime enable line to a second portion of the drive line extending from the check valve to the second inlet port of the default valve.

7. The hydraulic control system of claim 6 wherein the first portion of the drive line is connected to an exhaust port of the manual valve when the manual valve is closed, and therefore the check valve is configured to prevent fluid in the clutch prime enable line from exhausting through the manual valve.

8. The hydraulic control system of claim 6 further comprising a second clutch supply line that is connected to the second portion of the drive line, wherein when the default valve and the clutch prime valve are open, pressurized fluid is allowed to flow from the pressurized line to the second clutch supply line and thereby prime a second clutch of the transmission.

9. The hydraulic control system of claim 1 wherein:

the clutch prime feed line supplies pressurized fluid to a torque converter clutch valve when the default valve is open; and pressurized fluid in the clutch prime feed line is exhausted when the default valve is closed.

10. The hydraulic control system of claim 9 further comprising a valve diagnostic module configured to determine that the clutch prime valve is stuck open based on actuation of a torque converter clutch regulated by the torque converter clutch valve.

11. A hydraulic control system for a transmission, the hydraulic control system comprising:

a manual valve having an inlet port connected to a pressurized line and an outlet port connected to a drive line;

a default valve having a first inlet port connected to the pressurized line, a first outlet port connected to a clutch prime feed line, a second inlet port connected to the drive line, and a second outlet port connected to a first clutch supply line; and a clutch prime valve having an inlet port connected to the clutch prime feed line and an outlet port connected to the drive line via a clutch prime enable line, wherein when the manual valve is closed, the default valve is open, and the clutch prime valve is open, pressurized fluid is allowed to flow from the pressurized line to the first clutch supply line and thereby prime a first clutch of the transmission.

12. The hydraulic control system of claim 11 wherein:

the manual valve allows fluid flow from its inlet port to its outlet port when the manual valve is open;

the manual valve prevents fluid flow from its inlet port to its outlet port when the manual valve is closed;

the manual valve is open when the transmission is in drive or reverse; and the manual valve is closed when the transmission is in neutral or park.

13. The hydraulic control system of claim 11 wherein:

the default valve allows fluid flow from the first and second inlet ports to the first and second outlet ports, respectively, when the default valve is open; and the default valve prevents fluid flow from the first and second inlet ports to the first and second outlet ports, respectively, when the default valve is closed.

14. The hydraulic control system of claim 11 wherein:

the clutch prime valve allows fluid flow from its inlet port to its outlet port when the clutch prime valve is open; and the clutch prime valve prevents fluid flow from its inlet port to its outlet port when the clutch prime valve is closed.

15. The hydraulic control system of claim 11 further comprising a default solenoid configured to regulate fluid flow to the default valve and thereby actuate the default valve between its open and closed positions.

16. The hydraulic control system of claim 11 further comprising a clutch prime solenoid configured to regulate fluid flow to the clutch prime valve and thereby actuate the clutch prime valve between its open and closed positions.

17. The hydraulic control system of claim 11 further comprising a check valve that connects the clutch prime enable line to the drive line, wherein the check valve:

prevents fluid flow from the clutch prime enable line to a first portion of the drive line extending from the outlet port of the manual valve to the check valve; and allows fluid flow from the clutch prime enable line to a second portion of the drive line extending from the check valve to the second inlet port of the default valve.

18. The hydraulic control system of claim 17 wherein the first portion of the drive line is connected to an exhaust port of the manual valve when the manual valve is closed, and therefore the check valve prevents fluid in the clutch prime enable line from exhausting through the manual valve.

19. The hydraulic control system of claim 17 further comprising a second clutch supply line that is connected to the second portion of the drive line, wherein when the default valve and the clutch prime valve are open, pressurized fluid is allowed to flow from the pressurized line to the second clutch supply line and thereby prime a second clutch of the transmission.

* * * * *